(12) United States Patent
Gao et al.

(10) Patent No.: US 12,087,917 B2
(45) Date of Patent: Sep. 10, 2024

(54) BATTERY HOUSING, ENERGY STORAGE BATTERY AND ENERGY STORAGE SYSTEM

(71) Applicants: ZHEJIANG JINKO SOLAR CO., LTD., Zhejiang (CN); JINKO SOLAR CO., LTD., Jiangxi (CN)

(72) Inventors: Yunhui Gao, Zhejiang (CN); Juan Wang, Zhejiang (CN); Zhiqiu Guo, Zhejiang (CN)

(73) Assignees: ZHEJIANG JINKO SOLAR CO., LTD., Haining Zhejiang (CN); JINKO SOLAR CO., LTD., Jiangxi (CN)

( * ) Notice: Subject to any disclaimer, the term of this patent is extended or adjusted under 35 U.S.C. 154(b) by 359 days.

(21) Appl. No.: 17/394,371

(22) Filed: Aug. 4, 2021

(65) Prior Publication Data

US 2022/0399577 A1    Dec. 15, 2022

(30) Foreign Application Priority Data

Jun. 11, 2021 (CN) .......................... 202110656050.5

(51) Int. Cl.
| | |
|---|---|
| *H01M 50/209* | (2021.01) |
| *H01M 10/42* | (2006.01) |
| *H01M 50/172* | (2021.01) |
| *H01M 50/543* | (2021.01) |

(52) U.S. Cl.
CPC ....... *H01M 10/425* (2013.01); *H01M 50/172* (2021.01); *H01M 50/209* (2021.01); *H01M 50/543* (2021.01); *H01M 2010/4271* (2013.01)

(58) Field of Classification Search
CPC ............. H01M 10/425; H01M 50/209; H01M 50/543; H01M 50/172; H01M 2010/4271
See application file for complete search history.

(56) References Cited

U.S. PATENT DOCUMENTS

| | | | |
|---|---|---|---|
| 6,455,189 B1 | 9/2002 | Nadeau et al. | |
| 2006/0211282 A1* | 9/2006 | Onogi | B62J 11/19 439/127 |

(Continued)

FOREIGN PATENT DOCUMENTS

| | | |
|---|---|---|
| CN | 201717326 U | 1/2011 |
| CN | 201927641 U | 8/2011 |

(Continued)

OTHER PUBLICATIONS

Zhejiang Jinko Solar Co., Ltd., et al., Partial European Search Report, EP 21189005.8, Jan. 25, 2022, 13 pgs.

*Primary Examiner* — Alexander Usyatinsky
(74) *Attorney, Agent, or Firm* — USCH Law, PC

(57) ABSTRACT

The present disclosure provides a battery housing including a recess and a communication wiring socket. The recess is recessed inward from a side wall of the battery housing. The communication wiring socket is provided on an inner wall of the recess and configured to connect with a battery management system disposed within the battery housing. The recess is configured to provide a handheld space and to receive a communication wiring terminal plugged into the communication wiring socket. The present disclosure further provides an energy storage battery including the battery housing, and an energy storage system including the energy storage battery.

19 Claims, 6 Drawing Sheets

(56) References Cited

U.S. PATENT DOCUMENTS

| | | | | |
|---|---|---|---|---|
| 2009/0027218 | A1* | 1/2009 | Yoo | H01M 10/48 |
| | | | | 340/636.1 |
| 2010/0116570 | A1* | 5/2010 | Sugawara | H01M 50/35 |
| | | | | 429/82 |
| 2011/0291608 | A1* | 12/2011 | Shimura | H01M 10/488 |
| | | | | 320/101 |
| 2013/0181510 | A1* | 7/2013 | Ichikawa | H01M 50/249 |
| | | | | 307/9.1 |
| 2016/0111692 | A1 | 4/2016 | Morita et al. | |
| 2018/0254442 | A1* | 9/2018 | Shimizu | H01R 11/11 |
| 2021/0091438 | A1 | 3/2021 | Backhaus | |
| 2021/0135301 | A1 | 5/2021 | Choi et al. | |

FOREIGN PATENT DOCUMENTS

| | | |
|---|---|---|
| CN | 201956432 U | 8/2011 |
| CN | 104134762 A | 11/2014 |
| CN | 207183335 U | 4/2018 |
| CN | 207804187 U | 9/2018 |
| CN | 207909992 U | 9/2018 |
| CN | 110246994 A | 9/2019 |
| CN | 209418634 U | 9/2019 |
| EP | 2989668 A1 | 3/2016 |
| JP | S6476667 A | 3/1989 |
| JP | 2017073957 A | 4/2017 |
| JP | 2019512844 A | 5/2019 |

* cited by examiner

BATTERY HOUSING, ENERGY STORAGE BATTERY AND ENERGY STORAGE SYSTEM

CROSS-REFERENCE TO RELATED APPLICATION

The application claims priority to Chinese Patent Application No. 202110656050.5, filed on Jun. 11, 2021, entitled "HOUSING OF ENERGY STORAGE BATTERY, ENERGY STORAGE BATTERY AND ENERGY STORAGE SYSTEM," which is incorporated herein by reference in its entirety.

TECHNICAL FIELD

The embodiments of the present disclosure relate to the field of electronics technology, in particular to a battery housing, an energy storage battery and an energy storage system.

BACKGROUND

At present, an energy storage battery is generally assembled with a prefabricated waterproof grip. During manufacture and assembly, the waterproof grip needs to be fixedly mounted on the housing of the energy storage battery. The waterproof grip is typical provided with a waterproof rubber ring at edges thereof. The waterproof grip of this type is cumbersome to assemble, has poor waterproof performance, and protrudes to an outside of the housing to which it is mounted and thus keeps occupying a peripheral space of the housing.

In addition, in the typical energy storage battery, a switch is disposed on a surface of the housing, and thus is easy to be accidentally touched by the operator, which may cause abnormal stop of the battery. In addition, the plug-and-play communication wiring terminals of the typical energy storage battery are disposed on the surface of the battery, which causes inconvenient transportation and affects installation and dimensions of the battery.

SUMMARY

The embodiments of the present disclosure aim to provide a battery housing, an energy storage battery and an energy storage system, which have less space occupation, provide protection for the communication wiring socket and the communication wiring terminal, and lead to convenience in transportation.

To solve the aforementioned technical problems, the embodiments of the present disclosure provide a battery housing including a recess and a communication wiring socket. The recess is recessed inward from a side wall of the battery housing. The communication wiring socket is provided on an inner wall of the recess and configured to connect with a battery management system disposed within the battery housing. The recess is configured to provide a handheld space and to receive a communication wiring terminal plugged into the communication wiring socket.

The recess recessed inward from the side wall of the battery housing provides the handheld space for the energy storage battery, without operation of fixedly mounting a prefabricated grip on the battery housing of the energy storage battery, and thus saving external space of the energy storage battery that may be occupied by the prefabricated grip. Meanwhile, the recess and the side wall of the battery housing are integrally formed without seams, thereby improving waterproof effect of edges of the recess to prevent moisture from entering an interior of the battery housing and damaging a battery and a battery management system disposed therein. The communication wiring socket connected to the battery management system of the energy storage battery is disposed on the inner wall of the recess, such that the space of the recess is further configured to accommodate the communication wiring socket and the communication wiring terminal plugged into the communication wiring socket, which effectively avoids the communication wiring terminal extending outside the battery housing, thus saves external space of the energy storage battery that may be occupied by the communication wiring terminal. Meanwhile, the recess provides protection for the communication wiring socket and the communication wiring terminal.

In an embodiment, the communication wiring terminal is sleeved with a waterproof jacket. The waterproof jacket is received within the recess when the communication wiring terminal is plugged into the communication wiring socket. By receiving the waterproof jacket into the recess, external space of the energy storage battery that may be occupied by the waterproof jacket is saved. The recess further provides protection for the waterproof jacket.

In an embodiment, a push button configured to connect the battery management system inside the battery housing is provided on the inner wall of the recess. The push button and the communication wiring socket are disposed on a vertical inner wall of the recess, and the push button is located closer to an opening of the recess than the communication wiring socket. This facilitates manual operation of the push button.

In an embodiment, the push button is located closer to an upper inner wall of the recess than the communication wiring socket. Alternatively, the push button is located farther away from the upper inner wall of the recess than the communication wiring socket. The push button and the communication wiring socket are horizontally misaligned, so as to save space of the recess occupied by the push button and the communication wiring socket.

In an embodiment, the battery housing further includes a wiring groove defined by a recessed side wall of the battery housing and extending in a vertical direction of the battery housing. A through hole is defined on an inner side wall of the wiring groove and communicates the wiring groove and the recess that are disposed on the same side wall of the battery housing. The wiring groove is configured to receive leads of the communication wiring terminal. The wiring groove is convenient for receiving the leads of the communication wiring terminal plugged into the communication wiring socket and thus facilitate wiring.

In an embodiment, the battery housing further includes a cover plate provided on the wiring groove to cover an internal space of the wiring groove. Elements within the wiring groove are shielded by the cover plate.

In an embodiment, the wiring groove is disposed at a vertical edge transitioning the side wall and a rear wall of the battery housing. The recess is disposed closer to a front wall of the battery housing than the wiring groove. The leads of the communication wiring terminal plugged into the communication wiring socket within the recess are led to pass through the through hole and enter the wiring groove, and thus are invisible when viewed from the front side of the energy storage battery.

In an embodiment, recessing depths of the wiring groove and the recess that are located at the same side wall of the battery housing are equal.

In an embodiment, the battery housing further includes two opposing side walls on each of which is provided with the recess. The push button disposed within the recess on one of the two opposing side walls is a start-stop button for the energy storage battery. The push button located in the recess on the other one of the two opposing side walls is a reset button for the energy storage battery. The start-stop button and the reset button for the energy storage battery are disposed within the recess for protection.

In an embodiment, an upper inner wall of the recess is covered with a metal sheet structure having an air layer. The metal sheet structure has a higher structurally supporting strength to avoid deformation of a contact region and enable a force applied to the user's hand evenly distributed, and further serves as a buffer to improve comfortableness for the user's hand.

In an embodiment, the wiring groove is further provided with a power wiring socket connected to a battery unit disposed within the battery housing. The power wiring socket is configured to be plugged by a power wiring terminal in such a way that the power wiring terminal is received within the wiring groove. A passage for power wiring is formed with the wiring groove which accommodates the power wiring socket and the power wiring terminal.

In an embodiment, the battery housing further includes two opposing side walls on each of which is provided with the wiring groove. Two positive power wiring sockets are provided within the wiring groove on one of the two opposing side walls. Two negative power wiring sockets are provided within the wiring groove on the other one of the two opposing side walls. At least one of an upper surface and a lower surface of the battery housing is provided with a locking structure for connection with a battery housing of an other energy storage battery vertically adjacent. Alternatively, both the upper surface and the lower surface of the battery housing are planar. Since the two power wiring sockets provided at the same side of the battery housing have the same polarity, parallel connection between the energy storage batteries is facilitated. Meanwhile, due to the locking structure provided on the upper surface and/or the lower surface, or that the upper surface and the lower surface of the battery housing are planar, a plurality of energy storage batteries are enable to be stacked in a vertical direction to form a stable stacked structure.

The embodiments of the present disclosure further provide an energy storage battery including a battery housing aforementioned, a battery management system and a battery cell. The battery housing defines a cavity in which the battery management system and the battery unit that are disposed. The recess is located in a spare space of the cavity between the battery management system and the battery cell, and an upper inner wall of the recess is horizontally disposed.

In an embodiment, the recess has a depth of 58 mm, a width of 100 mm, and a height of 55 mm. The recess provides a comfortable handheld space for the user.

The embodiments of the present disclosure further provide an energy storage system including a plurality of energy storage batteries aforementioned. The plurality of energy storage batteries are stacked in the vertical direction. Wiring grooves of the plurality of energy storage batteries communicate with each other. In this way, the energy storage system has a compact arrangement, and thus has a reduced size for saving space.

In an embodiment, the two positive power wiring sockets of an energy storage battery are respectively connected to two positive power wiring sockets of two adjacent energy storage batteries through power wiring terminals, the two negative power wiring sockets of the energy storage battery are respectively connected to two negative power wiring sockets of two adjacent energy storage batteries through power wiring terminals, and the two adjacent energy storage batteries are respectively disposed above and below the energy storage batter. In this way, parallel connection of the plurality of energy storage batteries are facilitated.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

Figure 1:
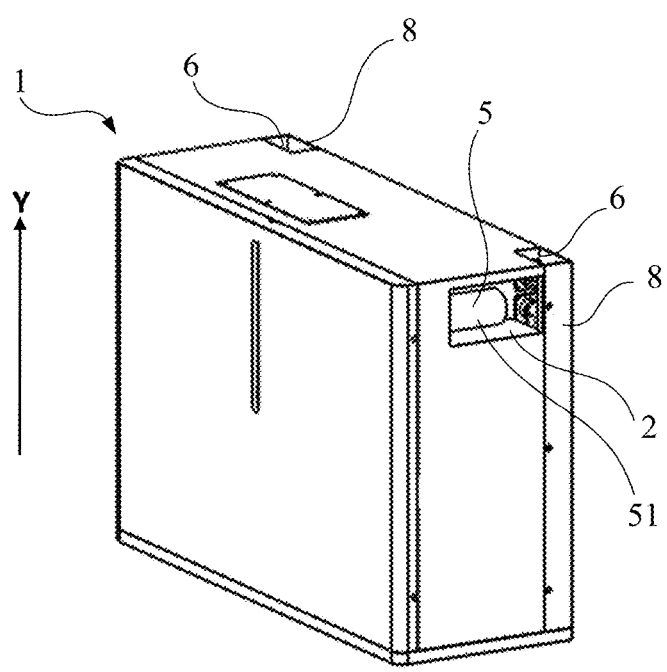
FIG. 1 is a front-right-top perspective view of a battery housing according to a first embodiment.

The embodiments of the present disclosure will be described in detail below with reference to the accompanying drawings in order to make the objectives, technical solutions and advantages of the present disclosure clearer. However, it will be apparent to those skilled in the art that, in the various embodiments of the present disclosure, numerous technical details are set forth in order to provide the reader with a better understanding of the present disclosure. However, the technical solutions claimed in the present disclosure may be implemented without these technical details and various changes and modifications based on the following embodiments.

Embodiments of the present disclosure provide a battery housing. As shown in FIGS. 1-4, the battery housing of the energy storage battery 1 includes a recess 2 recessed inward from a side wall of the battery housing; a communication wiring socket 4 provided on an inner wall of the recess 2 and configured to connect with a battery management system (not shown) disposed within the battery housing. The recess 2 is configured to provide a handheld space and to receive a communication wiring terminal 5 plugged into the communication wiring socket 4.

The recess recessed inward from the side wall of the battery housing provides the handheld space for the energy storage battery, without operation of fixedly mounting a prefabricated grip on the battery housing of the energy storage battery, and thus saving external space of the energy storage battery that may be occupied by the prefabricated grip. Meanwhile, the recess and the side wall of the battery housing are integrally formed without seams, thereby improving waterproof effect of edges of the recess to prevent moisture from entering an interior of the battery housing and damaging a battery and a battery management system disposed therein. The communication wiring socket connected to the battery management system of the energy storage battery is disposed on the inner wall of the recess, such that the space of the recess is further configured to accommodate the communication wiring socket and the communication wiring terminal plugged into the communication wiring socket, which effectively avoids the communication wiring terminal extending outside the battery housing, thus saves external space of the energy storage battery that may be occupied by the communication wiring terminal. Meanwhile, the recess provides protection for the communication wiring socket and the communication wiring terminal.

Implementation details of the present embodiment will be described as follows, which are merely provided for easy understanding of the present disclosure, and are not intend to limit the present disclosure.

As shown in FIGS. 1 to 4, the battery housing of the energy storage battery 1 in this embodiment may be a housing on both sides of the energy storage battery 1. The recess 2 may be disposed at an upper portion of the housing so as to facilitate hand-holding and carrying. The handheld space of the recess 2 may be a space extending horizontally or obliquely upward, and toward an inner side of the battery housing. The specific structure, number, function of the communication wiring socket 4 disposed within the recess 2, as well as the position of the communication wiring socket 4 on the inner wall of the recess 2 are not limited herein. For example, the communication wiring socket 4 may be a socket for communication, such as a network cable connecting port, a COM serial port, or the like.

Figure 2:
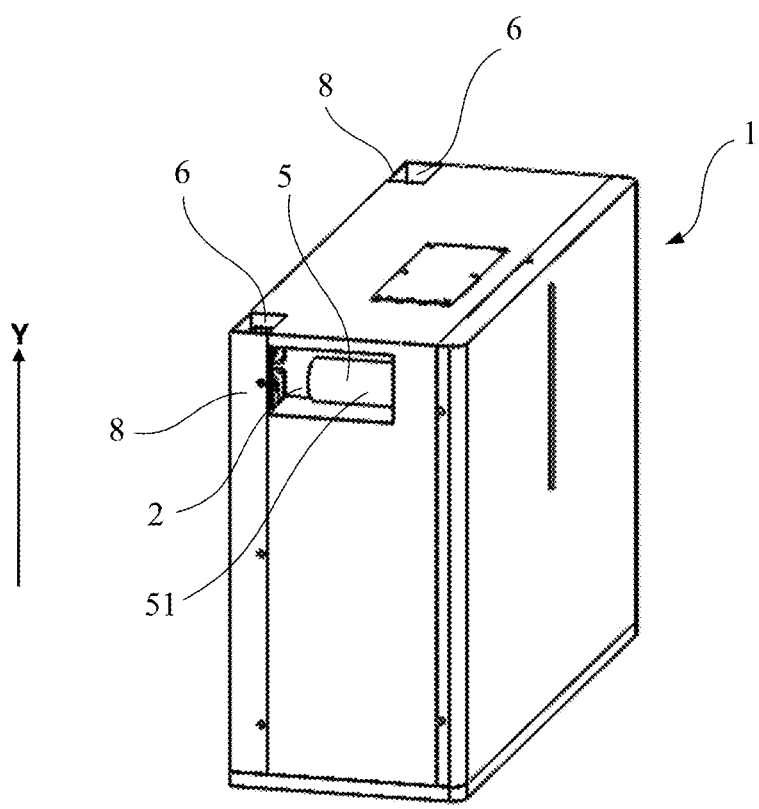
FIG. 2 is a front-left-top perspective view of the battery housing according to the first embodiment.

In one example, as shown in FIG. 1 or FIG. 2, the communication wiring terminal 5 is sleeved with a waterproof jacket 51 which is received within the recess 2 when the communication wiring terminal 5 is plugged into the communication wiring socket 4. By being received into the recess 2, the waterproof jacket 51 is prevented from protruding to the outside of the battery housing of the energy storage battery 1, thereby saving external space of the energy storage battery that may be occupied by the waterproof jacket 51. The recess 2 further provides protection for the waterproof jacket 51.

Figure 3:
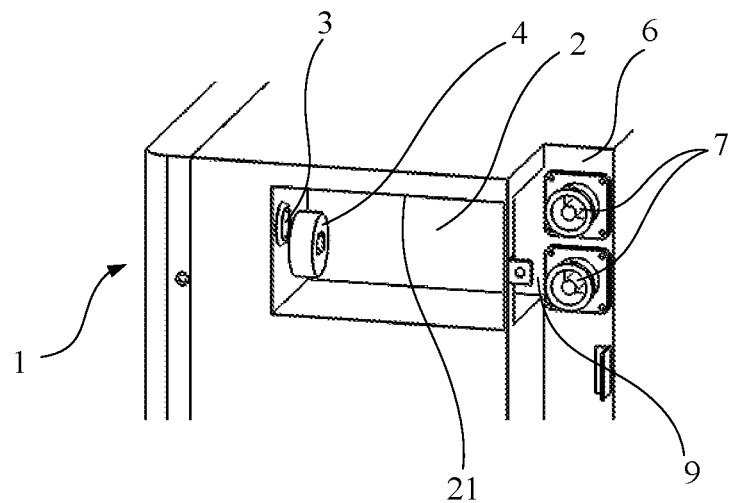
FIG. 3 is a locally enlarged view of the battery housing of FIG. 1, with the cover plate removed.
Figure 4:
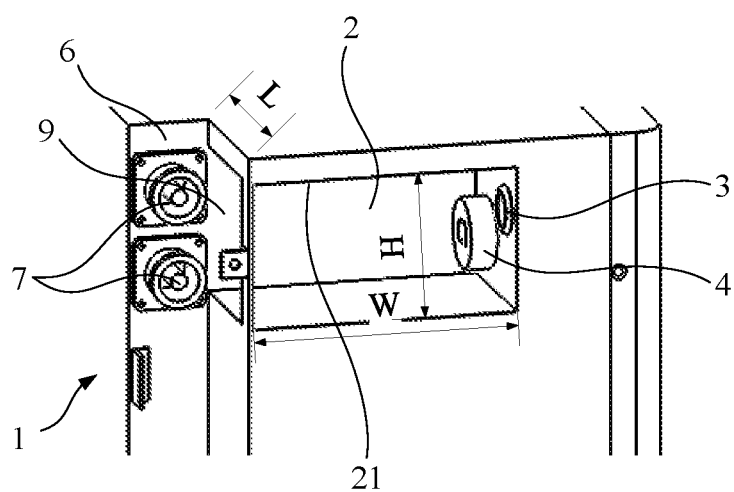
FIG. 4 is a locally enlarged view of the battery housing of FIG. 2, with the cover plate removed.

In one example, as shown in FIG. 3 or FIG. 4, a push button 3 configured to connect the battery management system inside the battery housing is provided on the inner wall of the recess 2. Both the push button 3 and the communication wiring socket 4 are disposed on a vertical inner wall of the recess 2, and the push button 3 is located closer to an opening of the recess 2 compared with the communication wiring socket 4. The specific structure, number, function of the push button 3 disposed within the recess 2, as well as the position of the push button 3 on the inner wall of the recess 2 are not limited herein. For example, the push button 3 may be a start-stop button or a reset button for the energy storage battery 1.

For example, the push button 3 and the communication wiring socket 4 are disposed on the vertical inner wall of the recess 2, so that both a pushing direction of the push button 3 and an extending direction of the communication wiring terminal 5 plugged into the communication wiring socket 4 are horizontal, so that an upper inner wall of the recess 2 and a space in the vicinity thereof are available for hand-holding, thereby facilitating access of the user's hand to the recess 2. The spare upper inner wall serves as a contact surface with the hand when the user is hand-holding and carrying the energy storage battery 1, avoiding accidental touch of the push button that may occur in the case of the push button being disposed on the upper inner wall. A lower inner wall of the recess 2 is out of occupation, such that during hand-holding and carrying the energy storage battery 1, accidental touch of the push button that may occur in the case of the push button being disposed on the lower inner wall and affect carrying is effectively avoided. At the same time, it is also possible to avoid the problem of poor waterproofing effect on components disposed on the lower inner wall due to easy accumulation of water on the lower inner wall. The push button 3 is located closer to the opening of the recess 2 compared with the communication wiring socket 4, so that when the user's hand accesses the recess 2 and operates the push button, the communication wiring socket 4 is prevented from blocking the user's hand in the horizontal direction, thereby facilitating operation.

In one example, as shown in FIG. 3 or FIG. 4, the push button 3 is located closer to the upper inner wall of the recess 2 compared with the communication wiring socket 4, or farther away from the upper inner wall of the recess 2 compared with the communication wiring socket 4 (not shown). That is, the push button 3 and the communication wiring socket 4 are vertically offset from one another (i.e., horizontally misaligned). Since the handheld space of the recess 2 is limited by the size and arrangement of the internal elements of the energy storage battery 1, especially the vertical inner wall of the recess 2 having a small width in a recessing direction, the push button 3 and the communication wiring socket 4 are vertically offset from one another, which saves space compared with the case that the push button 3 and the communication wiring socket 4 are arranged side by side in the recessing direction, thereby saving internal space of the energy storage battery 1 occupied by the recess 2.

As shown in FIGS. 1-4, in the present embodiment, the battery housing further includes a wiring groove 6 defined by a recessed side wall of the battery housing and extending in a vertical direction Y of the battery housing. A through hole 9 is defined on an inner side wall of the wiring groove 6 and communicates the wiring groove 6 with the recess 2 that are disposed on the same side wall of the battery housing. The wiring groove 6 is configured to receive leads of the communication wiring terminal 5. The wiring groove is convenient for receiving the leads of the communication wiring terminal plugged into the communication wiring socket and thus facilitate wiring.

For example, at the side wall of the battery housing from which the recess 2 is recessed, the wiring groove 6 extending in the vertical direction of the battery housing is provided, and the recess 2 and the wiring groove 6 communicate with each other through the through hole 9 passing through the inner side wall of the wiring groove 6. The leads of the communication wiring terminal 5 plugged into the communication wiring socket 4 may pass through the through hole 9 into the wiring groove 6 which provides a passage for the leads. As an example, the wiring groove 6 may extend in the vertical direction of the battery housing to pass through an upper wall and a lower wall of the battery housing.

Figure 5:
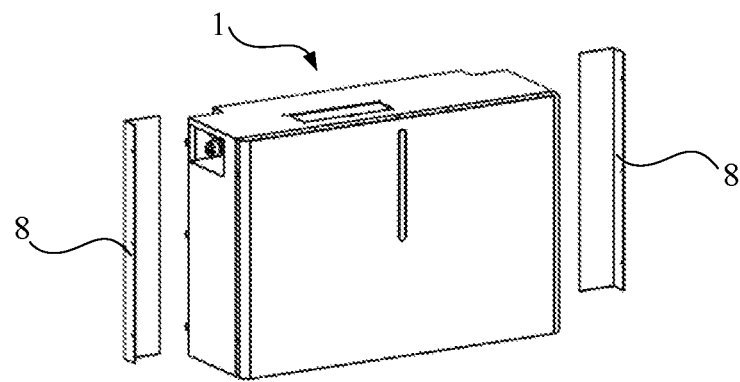
FIG. 5 is a front-left-top perspective view of the energy storage battery according to the first embodiment, with the cover plates separated from the battery housing.

In one example, as shown in FIGS. 3, 4 and 5, the battery housing of the energy storage battery 1 further includes a cover plate 8 provided on the wiring groove 6 to cover an internal space of the wiring groove 6. Elements within the wiring groove 6 are shielded by the cover plate 8. The cover plate 8 may be designed to form a part of a cuboid profile of the battery housing of the energy storage battery 1, such that the battery housing as a whole has a regular shape with a neat appearance and less space occupation.

In one example, as shown in FIGS. 3-4, the wiring groove 6 is disposed at a vertical edge transitioning the side wall and a rear wall of the battery housing, and the recess 2 is disposed closer to a front wall of the battery housing than the wiring groove 6.

For example, when the communication wiring socket 4 is disposed on a front inner wall of the recess 2, the leads of the communication wiring terminal 5 plugged into the communication wiring socket 4 naturally extend toward a rear inner wall, pass through the through hole 9 and enter the wiring groove 6, which forms a passage for leads of the communication wiring terminal 5. Since the wiring groove 6 is defined by the recessed side wall of the battery housing, the leads of the communication wiring terminal 5 may not protrude out of the side wall of the battery housing of the energy storage battery 1, thereby saving external space of the energy storage battery 1 that may be occupied by the leads of the communication wiring terminal 5. Moreover, since the wiring groove 6 is arranged at the vertical edge transitioning the side wall and the rear wall of the battery housing, wiring of the communication wiring terminal 5 is invisible when viewed from the front side of the energy storage battery, so that the wiring of the communication wiring terminal 5 is well hidden.

In one example, recessing depths of the wiring groove 6 and the recess 2 that are located at the same side wall of the battery housing are equal, thereby facilitating wiring. In one example, as shown in FIGS. 1 and 2, the push button 3 disposed within the recess 2 on one side wall of the battery housing is a start-stop button for the energy storage battery, and the push button 3 located in the recess 2 on the other side wall of the battery housing is a reset button for the energy storage battery. The plurality of buttons 3 are evenly disposed within the two recesses 2, thereby saving the space occupied by each recess 2 can be reduced. As an alternative, the plurality of buttons 3 may be disposed in the same recess 2 if the handheld space of the recess 2 is sufficient.

In one example, the upper inner wall of the recess 2 is covered with a metal sheet structure which includes an air layer (not shown). For example, the metal sheet structure with a thickness of 10 mm is formed a top of the recess 2, and includes two metal sheet layers and the air layer arranged between the two metal sheet layers, so that the metal sheet structure has a higher structurally supporting strength to avoid deformation of a contact region and enable a force applied to the user's hand evenly distributed, and further serves as a buffer to improve comfortableness for the user's hand.

In one example, as shown in FIGS. 1 and 2, a power wiring socket 7 connected to a battery unit disposed within the battery housing is provided within each wiring groove 6. The power wiring socket 7 is configured to be plugged by a power wiring terminal which thus is received within the wiring groove 6.

One or more power wiring sockets 7 are provided in each wiring groove 6, and the number thereof is not limited herein. The wiring groove 6 accommodates the power wiring socket 7 and the power wiring terminal, and forms a passage for the power wiring, thereby reducing space occupation of the energy storage battery 1.

In one example, as shown in FIGS. 1 and 2, two power wiring sockets 7 are provided in each wiring groove 6. Two power wiring sockets 7 located in the wiring groove 6 on one side wall of the battery housing are positive wiring sockets, and two power wiring sockets 7 located in the wiring groove 6 on the other side wall of the battery housing are negative wiring sockets. At least one of an upper surface and a lower surface of the battery housing is provided with a locking structure 13 for connection with a battery housing of another energy storage battery vertically adjacent, shown in FIGS. 8 and 9. Alternatively, both the upper surface and the lower surface of the battery housing are planar. Since the two power wiring sockets 7 provided at the same side of the battery housing have the same polarity, parallel connection between the energy storage batteries is facilitated. Meanwhile, due to the locking structure 13 provided on the upper surface and/or the lower surface, or that the upper surface and the lower surface of the battery housing are planar, a plurality of energy storage batteries are enable to be stacked in the vertical direction to form a stable stacked structure.

In this embodiment, the specific form of the locking structure 13 is not limited herein. For example, the locking structure 13 may be matched in shape, such as recesses and protrusions that are matching each other.

Figure 6:
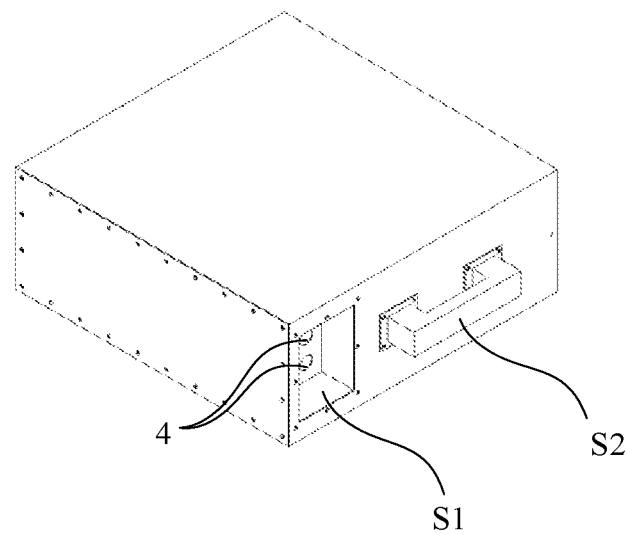
FIG. 6 is a schematic diagram of the energy storage battery according to another example of the first embodiment.

In addition, in a practical application scenario, structures including the recess 2 and the communication wiring socket 4 of the battery housing according to the embodiment of the present disclosure may further used in combination with a conventional grip which may be disposed on a side wall of the battery housing of the energy storage battery. For example, as shown in FIG. 6, the structures (S1) of the battery housing according to the embodiment of the present disclosure and the conventional grip (S2) may be provided on the same side wall of the battery housing of the energy storage battery. During transportation, the conventional grip may serve as a main handle position for carrying, and the recess 2 according to the embodiment of the present disclosure may be used as an auxiliary handle position to assist the carrying. Two communication wiring sockets 4 are provided in the recess 2 and configured to be plugged by the communication wiring terminals.

Figure 7:
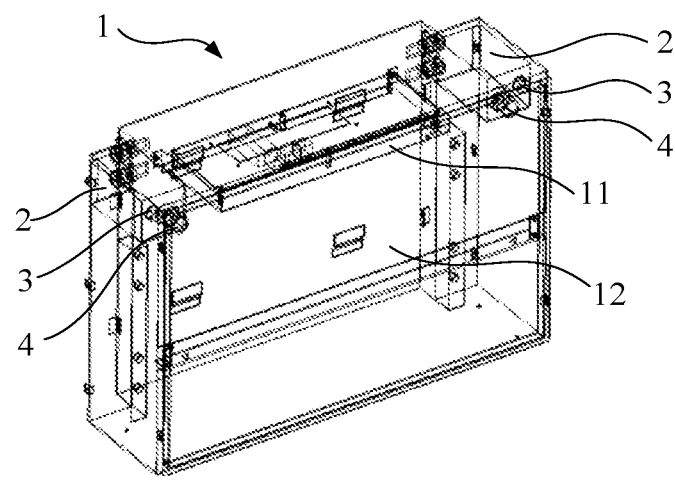
FIG. 7 is a front-left-top perspective view of an energy storage battery according to a second embodiment, with the internal parts shown and the cover plate removed.

Embodiments of the present disclosure provide an energy storage battery. As shown in FIG. 7, the energy storage battery 1 has a battery housing with at least one of the features as described in the aforementioned embodiments or examples. The battery housing defines a cavity in which a battery management system 11 and a battery unit 12 are disposed. The recess 2 is located in a spare space of the cavity between the battery management system 11 and the battery cell 12, and the upper inner wall of the recess 2 is horizontally disposed.

In one example, the battery management system 11 is disposed within an upper space of the cavity and the battery unit 12 is disposed in a lower space of the cavity, i.e., below the battery management system 11. Since the battery management system 11 has a horizontal width smaller than that of the battery unit 12, when the battery management system 11 and the battery unit 12 are aligned in the vertical direction, the spare space is defined above the battery unit 12 and on both sides the battery management system 11. In this example, the two recesses 2 are recessed into the spare space located respectively on both sides of the energy storage battery 1 to form the handheld space for the energy storage battery 1. In this way, the energy storage battery 1 may have its internal space fully utilized, and its overall volume reduced. The upper inner wall of the recess 2 may have a sufficiently horizontal extension within the spare space inside the energy storage battery 1, i.e., the upper inner wall is horizontally disposed, so that when the energy storage battery 1 is hand-held and carried by the user, the force applied to the user's hand is evenly distributed, resulting in comfortable experience.

The recess in this embodiment may provide a handheld space with a depth*width*height of 58 mm*100 mm*55 mm. As shown in FIG. 4, the depth (L) is a distance in the horizontal direction from an opening of recess 2 to an inner wall of recess 2 opposing the opening, the width (W) is a distance in the horizontal direction between the front inner wall and the rear inner wall of recess 2, and the height (H) is a distance in the vertical direction between the upper inner wall and the lower inner wall of the recess 2. The conventional structure combining the existing communication wiring terminal and waterproof jacket 51 is generally has length larger than 70 mm. The embodiment of the present disclosure overcomes dimensional limitation to the handheld space provided by the recess due to the limited inner space of the existing energy storage battery by fully utilizing the spare space between the battery management system 11 and the battery cell 12 to design a size with the height of 55 mm and the depth of 58 mm for the recess 2. In this way, the size and arrangement of the battery management system 11 and the battery cell 12 inside the energy storage battery is fully considered, the spare space without being occupied by the battery management system 11 and the battery cell 12 inside the energy storage battery is fully utilized, thereby maximizing the size of the recess 2 which, on the one hand, does not affect normal operation and heat dissipation of the battery management system 11 and the battery cell 12, and, on the other hand, provides the handheld space in which the upper inner wall of the recess 2 serving as a horizontal bearing surface with the maximum depth of 58 mm, thereby solving the problems concerning waterproofness, stability, comfortableness and space occupation of the handheld space.

Figure 8:
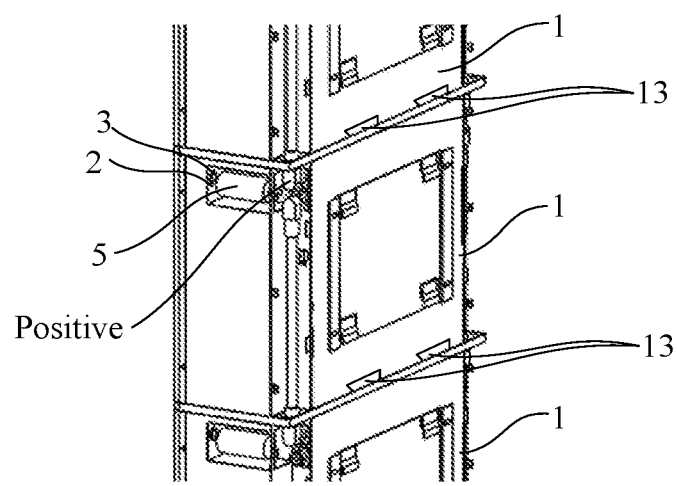
FIG. 8 is a rear-right perspective view of an energy storage system according to a third embodiment.
Figure 9:
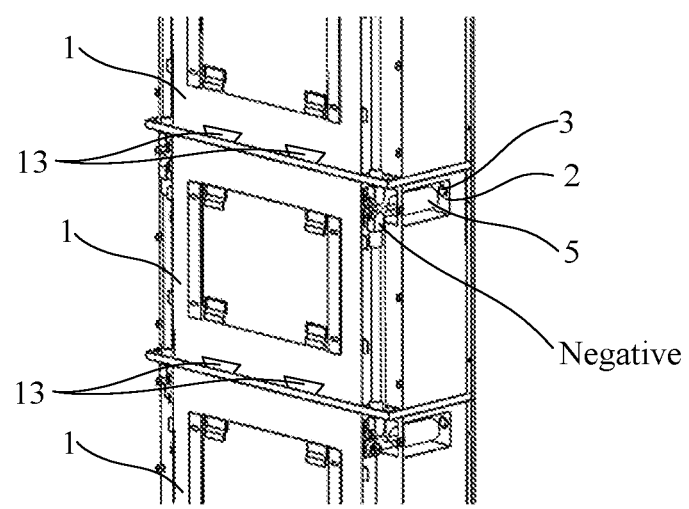
FIG. 9 is a rear-left perspective view of the energy storage system according to the third embodiment.

Embodiments of the present disclosure provide an energy storage system. As shown in FIGS. 8 and 9, the energy storage system includes a plurality of energy storage batteries 1 according to aforementioned embodiments or examples. The plurality of energy storage batteries 1 are stacked in the vertical direction, and the wiring grooves 6 of the plurality of energy storage batteries 1 communicate with each other.

In one example, the two positive wiring sockets of the energy storage battery 1 are each connected to one of two positive wiring sockets of either one of two adjacent energy storage batteries disposed above and below the energy storage battery 1 through power wiring terminals, as shown in FIG. 8. The two negative wiring sockets of the energy storage battery 1 are each connected to one of two negative wiring sockets of either one of two adjacent energy storage batteries disposed above and below the energy storage battery 1 through power wiring terminals, as shown in FIG. 9. In this way, parallel connection of the plurality of energy storage batteries 1 is achieved.

For example, when the plurality of energy storage batteries 1 are connected in parallel, the power wiring terminals connecting the positive wiring sockets and the power wiring terminals connecting the negative wiring sockets are separated and disposed on both sides of the energy storage batteries 1, providing a safe and fool-proof operation for the user to prevent mistakenly mixed connection of the positive and negative wiring sockets, and further avoiding the problem of cumbersome wiring due to excessive leads. An upper one of the two positive (negative) wiring sockets of the energy storage battery 1 is connected to a lower one of two positive (negative) wiring sockets of an adjacent energy storage battery disposed above the energy storage battery 1 through the power wiring terminals, and likewise, a lower one of the two positive (negative) wiring sockets of the energy storage battery 1 is connected to an upper one of two positive (negative) wiring sockets of an adjacent energy storage battery disposed below the energy storage battery 1 through the power wiring terminals, thereby avoiding wiring interference of the terminals.

The recess recessed inward from the side wall of the battery housing provides the handheld space for the energy storage battery, without operation of fixedly mounting a prefabricated grip on the battery housing of the energy storage battery, and thus saving external space of the energy storage battery that may be occupied by the prefabricated grip. Meanwhile, the recess and the side wall of the battery housing are integrally formed without seams, thereby improving waterproof effect of edges of the recess to prevent moisture from entering an interior of the battery housing and damaging a battery and a battery management system disposed therein.

The communication wiring socket connected to the battery management system of the energy storage battery is disposed on the inner wall of the recess, such that the space of the recess is further configured to accommodate the communication wiring socket and the communication wiring terminal plugged into the communication wiring socket, which effectively avoids the communication wiring terminal extending outside the battery housing, thus saves external space of the energy storage battery that may be occupied by the communication wiring terminal. Meanwhile, the recess provides protection for the communication wiring socket and the communication wiring terminal.

The wiring grooves 6 are arranged at both sides of the rear wall of the battery housing and extend in the vertical direction of the battery housing to pass through the upper wall and the lower wall of the battery housing. When the plurality of energy storage batteries 1 are stacked and connected in parallel, the wiring grooves 6 at each side may communicate with each other to provide a passage for wiring of the power wiring terminals connecting the positive or the negative power wiring sockets, which is greatly convenient for arrangement and operation of parallel connection of the energy storage batteries 1. After being connected by the power wiring terminals at both sides, the plurality of energy storage batteries 1 are safely and firmly connected to form a whole structure which does not occupy any extra space except the energy storage batteries themselves. This is of great significance for intensive design of the energy storage system.

Those skilled in the art should appreciate that the aforementioned embodiments are specific embodiments for implementing the present disclosure. In practice, however, various changes may be made in the forms and details of the specific embodiments without departing from the spirit and scope of the present disclosure.

What is claimed is:
1. A battery housing, comprising:
a recess recessed inward from a side wall of the battery housing; and
a communication wiring socket provided on an inner wall of the recess and configured to connect with a battery management system disposed within the battery housing;

wherein the recess is configured to provide a handheld space and to receive a communication wiring terminal plugged into the communication wiring socket;
wherein the battery housing further comprises a wiring groove defined by a recessed edge of the side wall of the battery housing and extending in a vertical direction of the battery housing, wherein a through hole is defined on an inner side wall of the wiring groove to allow communication between the wiring groove and the recess that are disposed at the side wall of the battery housing, and the wiring groove is configured to receive leads of the communication wiring terminal.

2. The battery housing according to claim 1, wherein the communication wiring terminal is sleeved with a waterproof jacket, and the waterproof jacket is received within the recess when the communication wiring terminal is plugged into the communication wiring socket.

3. The battery housing according to claim 1, wherein a push button configured to connect the battery management system inside the battery housing is provided on the inner wall of the recess, the push button and the communication wiring socket are disposed on a vertical inner wall of the recess, and the push button is located closer to an opening of the recess than the communication wiring socket.

4. The battery housing according to claim 3, wherein the push button and the communication wiring socket are horizontally misaligned.

5. The battery housing according to claim 1, further comprising a cover plate provided on the wiring groove to cover an internal space of the wiring groove.

6. The battery housing according to claim 1, wherein the wiring groove is disposed at a vertical edge transitioning the side wall and a rear wall of the battery housing, and the recess is disposed closer to a front wall of the battery housing than the wiring groove.

7. The battery housing according to claim 6, wherein recessing depths of the wiring groove and the recess that are located at the side wall of the battery housing are equal.

8. The battery housing according to claim 6, comprising two opposing side walls on each of which is provided with the recess, the push button disposed within the recess on one of the two opposing side walls is a start-stop button for the energy storage battery, and the push button located in the recess on the other one of the two opposing side walls is a reset button for the energy storage battery.

9. The battery housing according to claim 1, wherein an upper inner wall of the recess is covered with a metal sheet structure having an air layer.

10. The battery housing according to claim 1, wherein the wiring groove is further provided with a power wiring socket connected to a battery unit disposed within the battery housing, wherein the power wiring socket is configured to be plugged by a power wiring terminal in such a way that the power wiring terminal is received within the wiring groove.

11. The battery housing according to claim 10, comprising two opposing side walls on each of which is provided with the wiring groove, wherein two positive power wiring sockets are provided within the wiring groove on one of the two opposing side walls, and two negative power wiring sockets are provided within the wiring groove on the other one of the two opposing side walls.

12. The battery housing according to claim 1, wherein at least one of an upper surface and a lower surface of the battery housing is provided with a locking structure for connection with a battery housing of an other energy storage battery vertically adjacent.

13. The battery housing according to claim 1, wherein both the upper surface and the lower surface of the battery housing are planar.

14. An energy storage battery comprising the battery housing of claim 1, and further comprising:
a battery management system and a battery unit that are disposed in a cavity defined by the battery housing;
wherein the recess is located in a spare space of the cavity between the battery management system and the battery cell, and an upper inner wall of the recess is horizontally disposed.

15. The energy storage battery according to claim 14, wherein the recess has a depth of 58 mm, a width of 100 mm, and a height of 55 mm.

16. The energy storage battery according to claim 14, wherein the battery unit is disposed below the battery management system, and has a horizontal width larger than that of the battery management system, the spare space is defined above the battery unit and beside the battery management system.

17. The energy storage battery according to claim 16, the battery management system and the battery unit are aligned in a vertical direction, the spare space is defined above the battery unit and on both sides the battery management system, and two recesses are provided on the both sides of the battery management system.

18. An energy storage system comprising a plurality of energy storage batteries stacked in the vertical direction, wherein each energy storage battery of the plurality of energy storage batteries comprises the battery housing of claim 1 and further comprises:
the battery management system and a battery unit that are disposed within a cavity defined by the battery housing;
wherein the wiring groove defined by the recessed edge of the side wall of the battery housing and extending in the vertical direction of the battery housing to pass through an upper wall and a lower wall of the battery housing;
wherein the recess is located in a spare space between the battery management system and the battery cell, and an upper inner wall of the recess is horizontally disposed; and
wherein wiring grooves of the plurality of energy storage batteries communicate with each other.

19. The energy storage system according to claim 18, wherein the battery housing comprises two opposing side walls on each of which is provided with the wiring groove, wherein two positive power wiring sockets are provided within the wiring groove on one of the two opposing side walls, and two negative power wiring sockets are provided within the wiring groove on the other one of the two opposing side walls; and
wherein the two positive power wiring sockets of an energy storage battery are respectively connected to two positive power wiring sockets of two adjacent energy storage batteries through power wiring terminals, the two negative power wiring sockets of the energy storage battery are respectively connected to two negative power wiring sockets of two adjacent energy storage batteries through power wiring terminals, and the two adjacent energy storage batteries are respectively disposed above and below the energy storage battery.

\* \* \* \* \*